United States Patent
Wu et al.

(10) Patent No.: US 7,174,146 B2
(45) Date of Patent: *Feb. 6, 2007

(54) METHOD AND APPARATUS FOR I/Q MISMATCH CALIBRATION IN A RECEIVER

(75) Inventors: Kuo-Ming Wu, Hsinchu (TW); Jui-Hsi Cheng, Hsinchu (TW); Mao-Ching Chiu, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 408 days.

This patent is subject to a terminal disclaimer.

(21) Appl. No.: 10/653,300

(22) Filed: Sep. 2, 2003

(65) Prior Publication Data

US 2005/0047536 A1 Mar. 3, 2005

(51) Int. Cl.
*H04B 1/10* (2006.01)

(52) U.S. Cl. .................. 455/296; 455/303; 455/313

(58) Field of Classification Search ............. 455/313, 455/334, 314; 375/316
See application file for complete search history.

(56) References Cited

U.S. PATENT DOCUMENTS 5,949,821 A * 9/1999 Emami et al. ............. 375/235
6,122,325 A * 9/2000 Mogre et al. .............. 375/261
6,330,290 B1 * 12/2001 Glas ........................ 375/324
2003/0095589 A1 * 5/2003 Jeong ....................... 375/147
2005/0026577 A1 * 2/2005 Chiu ........................ 455/130

* cited by examiner

*Primary Examiner*—Quochien B. Vuong
*Assistant Examiner*—Christian A. Hannon
(74) *Attorney, Agent, or Firm*—Thomas, Kayden, Horstemeyer & Risley (57) ABSTRACT

A method for I/Q mismatch calibration of a receiver having an I/Q correction module with correction parameters, comprising the steps of generating a test signal containing a single tone waveform with frequency of a carrier frequency plus a predetermined frequency, applying I/Q demodulation to reduce the central frequency of the test signal and outputting a demodulated signal, converting the demodulated signal to a digital signal, obtaining measures of the digital signal respectively indicative of the frequency response of the digital signal at the plus and minus predetermined frequencies, and calculating the set of the correction parameters for the I/Q correction module based on the measures.

14 Claims, 4 Drawing Sheets

METHOD AND APPARATUS FOR I/Q MISMATCH CALIBRATION IN A RECEIVER

FIELD OF THE INVENTION

The present invention relates to compensation of physical layer impairments in communication systems and particularly to a method and apparatus for I/Q mismatch calibration in a receiver.

DESCRIPTION OF THE PRIOR ART

OFDM is a multi-channel modulation system employing Frequency Division Multiplexing (FDM) of orthogonal sub-carriers, each modulating a low bit-rate digital stream. The simplest way to describe an orthogonal frequency-division multiplexing (OFDM) signal is as a set of closely spaced frequency-division multiplexed carriers. While this is a good starting point for those unfamiliar with the technology, it falls short as a model for analyzing the effects of signal impairment.

The reason it falls short is that the carriers are more than closely spaced; they are heavily overlapped. In a perfect OFDM signal, the orthogonality property prevents interference between overlapping carriers. This is different from the FDM systems. In FDM systems, any overlap in the spectrums of adjacent signals will result in interference. In OFDM systems, the carriers will interfere with each other only if there is a loss of orthogonality. So long as orthogonality can be maintained, the carriers can be heavily overlapped, allowing increased spectral efficiency.

Table 1 lists a variety of common analog signal impairments and their effects on both OFDM signals and the more familiar single-carrier modulations such as quadrature phase-shift keying (QPSK) or 64-QAM (quadrature amplitude modulation). Most of these impairments can occur in either the transmitter or the receiver.

| Impairment | OFDM | QPSK |
|---|---|---|
| I/Q gain balance | State spreading (uniform/carrier) | Distortion of constellation |
| I/Q quadrature skew | State spreading (uniform/carrier) | Distortion of constellation |
| I/Q channel mismatch | State spreading (non-uniform/carrier) | State spreading |
| Uncompensated frequency error | State spreading | Spinning constellation |
| Phase noise | State spreading (uniform/carrier) | Constellation phase arcing |
| Nonlinear distortion | State spreading | State spreading |
| Linear distortion | Usually no effect (equalized) | State spreading if not equalized |
| Carrier leakage | Offset constellation for center carrier only (if used) | Offset constellation |
| Frequency error | State spreading | Constellation phase arcing |
| Amplifier droop | Radial constellation distortion | Radial constellation distortion |
| Spurious | State spreading or shifting of affected sub-carrier | State spreading, generally circular |

For cost reasons, analog in-phase and quadrature (I/Q) modulators and demodulators are often used in transceivers—especially for wide bandwidth signals. Being analog, these I/Q modulators and demodulators usually have imperfections that result in an imperfect match between the two baseband analog signals, I and Q, which represent the complex carrier. For example, gain mismatch might cause the I signal to be slightly different from the Q. In a single-carrier modulation system, this results in a visible distortion in the constellation—the square constellation of a 64-QAM signal would become rectangular.

To better understand how gain imbalance will affect an OFDM signal, look at the equations describing each individual sub-carrier. In the following analysis, it is important to keep in mind that, while an individual sub-carrier is analyzed, the I/Q gain imbalance error is on the signal that is the composite of all sub-carriers.

In the equation (1), $C_{k,m}$ is a complex number representing the location of the symbol within the constellation for the kth sub-carrier at the mth symbol time. For example, if sub-carrier k is binary-phase-shift-keying (BPSK) modulated, then $C_{k,m}$ might take on values of $\pm 1+j0$. The complex exponential portion of equation (1) represents the kth sub-carrier, which is amplitude- and phase-modulated by the symbol $C_{k,m}$. Therefore:

$$C_{k,m}(e^{j2\pi k\Delta ft}) \qquad (1)$$

Using Euler's relation, the equation (1) can be rewritten as:

$$C_{k,m}(\cos(2\pi \cdot k\Delta ft)+j\sin(2\pi \cdot k\Delta ft)) \qquad (2)$$

Now add the term "β" to represent gain imbalance. For a perfect signal, set $\beta=0$. As shown, the gain imbalance term will also produce a gain change. This was done to simplify the analysis. Therefore:

$$C_{k,m}((1+\beta)\cos(2\pi \cdot k\Delta ft)+j\sin(2\pi \cdot k\Delta ft)) \qquad (3)$$

The equation can be rearranged and this can be rewritten as the sum of a perfect signal and an error signal:

$$C_{k,m}(\cos(2\pi \cdot k\Delta ft)+j\sin(2\pi \cdot k\Delta ft))+C_{k,m}\beta\cos(2\pi \cdot k\Delta ft) \qquad (4)$$

Finally, converting back into complex exponential notation, we get:

$$C_{k,m}e^{j2\pi k\Delta ft} + \left(C_{k,m}\frac{\beta}{2}\right)\cdot(e^{j2\pi k\Delta ft}+e^{-j2\pi k\Delta ft}) \qquad (5)$$

In words, the equation (5) shows that a gain imbalance produces two error terms. The first error term is at the frequency of the kth sub-carrier. The second error term is at the frequency of the −kth sub-carrier. The phase and magnitude of the error terms are proportional to the symbol received on the kth sub-carrier. Another way of saying this is that I/Q gain imbalance will result in each sub-carrier being interfered with by its frequency mirror-image sub-carrier. Persons skilled in the art will instantly recognize this as imperfect sideband cancellation.

The equation (5) has several implications. First, it is generally true that for sub-carriers used to carry data (as opposed to pilots), the symbol received at any given time on the kth sub-carrier is uncorrelated to the symbol on the −kth sub-carrier.

For a given sub-carrier, the lack of correlation from the mirror-image sub-carrier implies a certain randomness to the error. This results in a spreading of the sub-carrier's constellation states in a noise-like fashion. This is especially true for higher-order modulations such as 64-QAM. For lower-order modulations, such as BPSK, the error term from the mirror-image carrier has fewer states.

This can result in constellations where the BPSK pilot carriers of an 802.11a signal exhibit spreading that does not appear noise-like. Also, as the BPSK pilots do not have an imaginary component; the error terms associated with the pilot sub-carriers are real—so the spreading is only along the real (I) axis. Note that the phase relationships between the pilot carriers in an 802.11a system are highly correlated, so the errors introduced by quadrature errors are not random.

Quadrature skew produces error terms similar to those produced by gain imbalance. Quadrature skew occurs when the two oscillators used in an I/Q modulator or demodulator do not differ by exactly 90°. For a small angular error, it can be shown that the resulting error is orthogonal to the data. This is indicated by the j in front of the error terms in the equation (6). As with gain imbalance, the error generates energy at the kth and −kth sub-carriers. Again, the 802.11a BPSK pilots do not have an imaginary component, so the error term, which is now orthogonal, causes spreading along the Q axis. For the QPSK carriers in this example, the error is also orthogonal. However, unlike BPSK, a QPSK constellation doesn't look any different when rotated by 90°. (See the equation (6).):

$$C_{k,m} e^{j2\pi k \Delta ft} + j \frac{C_{k,m} \phi}{2} \cdot (e^{j2\pi k \Delta ft} + e^{-j2\pi k \Delta ft}) \quad (6)$$

In both 802.11a and Hiperlan2, a channel estimation sequence is transmitted at the beginning of a burst. This special sequence is used to train the receiver's equalizer. The intended function of the equalizer is to compensate the received signal for multi-path distortion—a linear impairment in the signal that is the result of multiple signal paths between the transmitter and the receiver. As the ideal channel estimation sequence is known by the receiver, the receiver can observe the effects of the channel on the transmitted signal and compute a set of equalizer coefficients.

In the transmitter, the channel estimation sequence is created by BPSK modulating all 52 carriers for a portion of the preamble. Not coincidentally, the equalizer consists of 52 complex coefficients—one for each sub-carrier. It should come as no surprise that each sub-carrier in the channel estimation sequence has the greatest influence on the equalizer coefficient computed for that same sub-carrier.

The channel estimation sequence, and the receiver algorithms that compute the equalizer coefficients, are not immune from signal impairments. Consider, for example, the effect of I/Q gain imbalance on sub-carriers +26 and −26 of the channel estimation sequence. Recall from equation (5) that each sub-carrier has two error terms: one at the same frequency as the sub-carrier, and one at the mirror image frequency. The I/Q gain imbalance will cause mutual interference between sub-carriers +26 and −26.

From the IEEE 802.11a standard, the sub-carrier modulation for the channel estimation sequence is defined to be $C_{-26}=1+j0$ and $C_{+26}=1+j0$. Using these values in equation (5), one can easily determine that the two sub-carriers, when combined with the resulting error terms, will suffer an increase in amplitude. The equalizer algorithm will be unable to differentiate the error from the actual channel response, and will interpret this as a channel with too much gain at these two sub-carrier frequencies. The equalizer will incorrectly attempt to compensate by reducing the gain on these sub-carriers for subsequent data symbols.

The result will be different for other sub-carrier pairs, depending on the BPSK channel estimation symbols assigned to each.

With QPSK sub-carriers, the equalizer error caused by gain imbalance, or quadrature skew, results in seven groupings in each corner. Each QPSK sub-carrier suffers from QPSK interference from its mirror image. This results in a spreading to four constellation points in each corner. Each QPSK sub-carrier also suffers from a bi-level gain error introduced by the equalizer. This would produce eight groupings, except that the gain error is such that corners of the groupings overlap at the ideal corner state. Only seven groupings are visible.

I/Q Channel Mismatch

When the frequency response of the baseband I and Q channel signal paths are different, an I/Q channel mismatch exists. I/Q channel mismatch can be modeled as a sub-carrier-dependent gain imbalance and quadrature skew. I/Q gain imbalance and quadrature skew, as described above, are simply a degenerate form of I/Q channel mismatch in which the mismatch is constant over all sub-carriers. Think of channel mismatch as gain imbalance and quadrature skew as a function of a sub-carrier. It is still generally true that channel mismatch causes interaction between the kth and −kth sub-carriers, but that the magnitude of the impairment could differ between the kth and the (k+n) th carriers.

In order to eliminate the effects of the previously described impairments on the OFDM systems, various kinds of compensation circuits and methods have been proposed.

Figure 1:
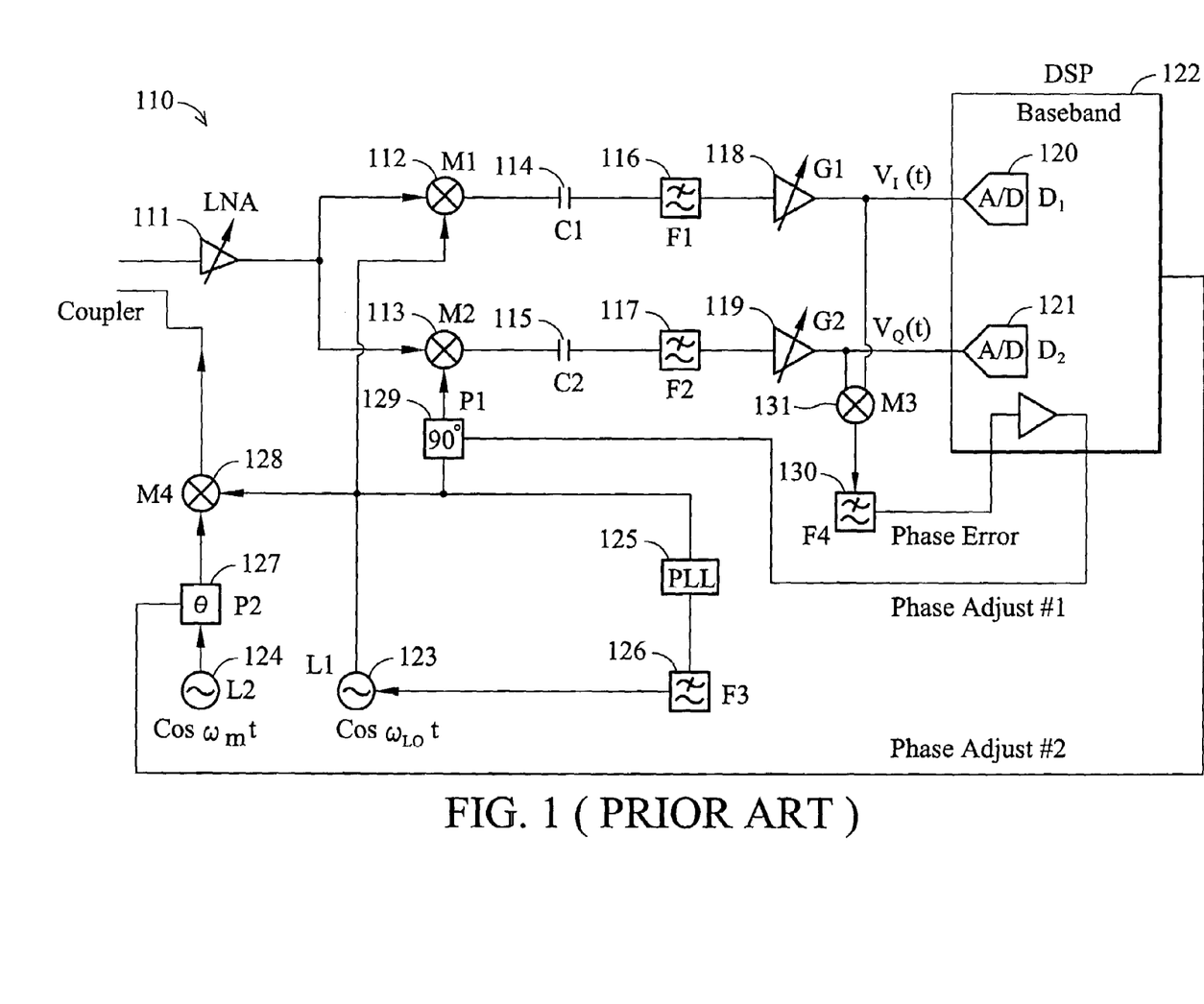
FIG. 1 shows a quadrature gain and phase imbalance correction circuitry of a receiver disclosed in U.S. patent application Ser. No. 285151.

FIG. 1 shows the quadrature gain and phase imbalance correction circuitry of a receiver disclosed in U.S. patent application Ser. No. 285151. FIG. 1 illustrates a communications device 110 suitable for receiving and correcting I and Q (In phase and Quadrature phase) signals. There are two essential parts to the device 110, the path of the received signals and the signal path of the signals used to mix with the received signals. The received signal path includes a low noise amplifier 111, two mixers 112 and 113, two coupling capacitors 114 and 115 and two filters 116 and 117. Finally the signal path contains gain amplifiers 118 and 119 before the received signal is input into A/D converters 120 and 121 for processing by the digital signal processor 122. The mixing signals are produced using local oscillators 123 and 124, a phase locked loop 125, a filter 126, a phase shifter 127 and a mixer 128.

In the received signal path, the LNA (111) is a standard low noise amplifier commonly used to amplify low power high frequency RF signals. The incoming radio signal LNA comes from an antenna (not shown). The received signal will be broken into quadrature components by using mixing circuits M1 (112) and M2 (113) and phase adjusting circuit P1 (129). The outputs of M1 and M2 will become the baseband signals. As is conventional in quadrature circuits, capacitors C1 and C2 (114 and 115) are used to block any DC components of the received signal and filters F1 and F2 (116 and 117) are used to further filter unwanted signals. Before any I/Q modulation is performed however, it is critical that the receiver be properly calibrated.

In order to produce a reliable calibration tone in the mixing signal path, the local oscillator L1 (123) is mixed with a low frequency tone produced by L2 (124). An example of these frequencies would be L1 set at 5 Gigahertz, while L2 is set at 5 Megahertz. The local oscillator L1 is also used with a Phase Locked Loop PLL (125) and a filter F3 (126). These two signals are multiplied by a mixing circuit M4 (128). The resulting multiplication of two sine waves of differing frequencies results in two signals being produced, wherein the resulting sine wave are at different frequencies. Therefore the mixer M4 produces two signals for the calibration process.

The two calibration tones will be fed into Mixers M1 and M2 for quadrature processing. The In-phase branch would be a clear signal but the Quadrature phase would be zero. In order to overcome this problem, a Phase Shifter P2 is implemented. The phase shifter P2 adds an angle theta to the frequency of a calibration tone signal. For example, when P2 is set to zero, $V_I(t)$ is cos ($\omega t$) and $V_Q(t)$ is zero. When P2 is set to 90 degrees, the $V_I(t)$ signal is nonexistent while $V_Q(t)$ is cos ($\omega t$).

The calibration process using Phase Shifter P2 (127) would then be as follows. P2 is adjusted so as to obtain the maximum value of signal in the $V_I(t)$ branch. The adjustment of P2 is performed by the Digital Signal Processing chip (122). The maximum signal level is measured by baseband processor chip 122 and stored. Then P2 is adjusted by 90 degrees until the signal in the Q branch is at a maximum level. The maximum level of the Q branch is also measured and stored in the baseband processor chip 122. Once these maximum values of each branch are known, the baseband processor chip may perform a gain imbalance calibration. This gain imbalance correction may be performed by amplifiers G1 and G2 (118 and 119) or after analogue to digital signal conversion (A/D) in the baseband processor chip 122. It is noted that G1 and G2 may perform the gain adjustments for the receiver as a whole. It is also noted that G1 and G2 are controlled together as opposed to separately. The I and Q gains are therefore made equal to avoid any sideband production and distortion of the desired signal. The present invention also allows for gain imbalance calibration to be performed at any level of gain as set by G1 and G2.

With respect to the I/Q phase error calibration, P2 would be set at an angle such as 45 degrees. This ensures a signal of almost equal value in both the I and Q branches. By simply multiplying the two signals one can detect the relative phase of the I and Q branches. The product of a sine and cosine signal should result in zero. Mixer circuit M3 (131) accomplishes the multiplication of the I and Q signals and outputs a signal to the filter F4 (130). If this is not the case, meaning that the I and Q branches are not exactly 90 degrees out of phase as desired, a phase error signal is produced. This signal is fed back through an amplifier and filter EF to Phase Shifter P1 to compensate for the error. Ideally the phase difference between the I and Q branches should be 90 degrees. Therefore, the adjustment of P2 with the appropriate gain control in addition with the adjustment of P1, allow for an optimum phase imbalance to be achieved. It is noted that P1 may be in the RF path instead of being in the local oscillator path if desired.

U.S. Pat. No. 6,122,325 also discloses a method for detecting and correcting in-phase/quadrature imbalance in digital communication receivers. The method includes the steps of assuming that a signal imbalance exists in the received signal, the signal imbalance having an amplitude imbalance and a phase imbalance, generating an amplitude imbalance correction factor and a phase imbalance correction factor to lessen the signal imbalance, and re-evaluating the amplitude and phase imbalance correction factors over a set of readings of the in-phase and quadrature components until the signal imbalance is minimized.

Figure 2:
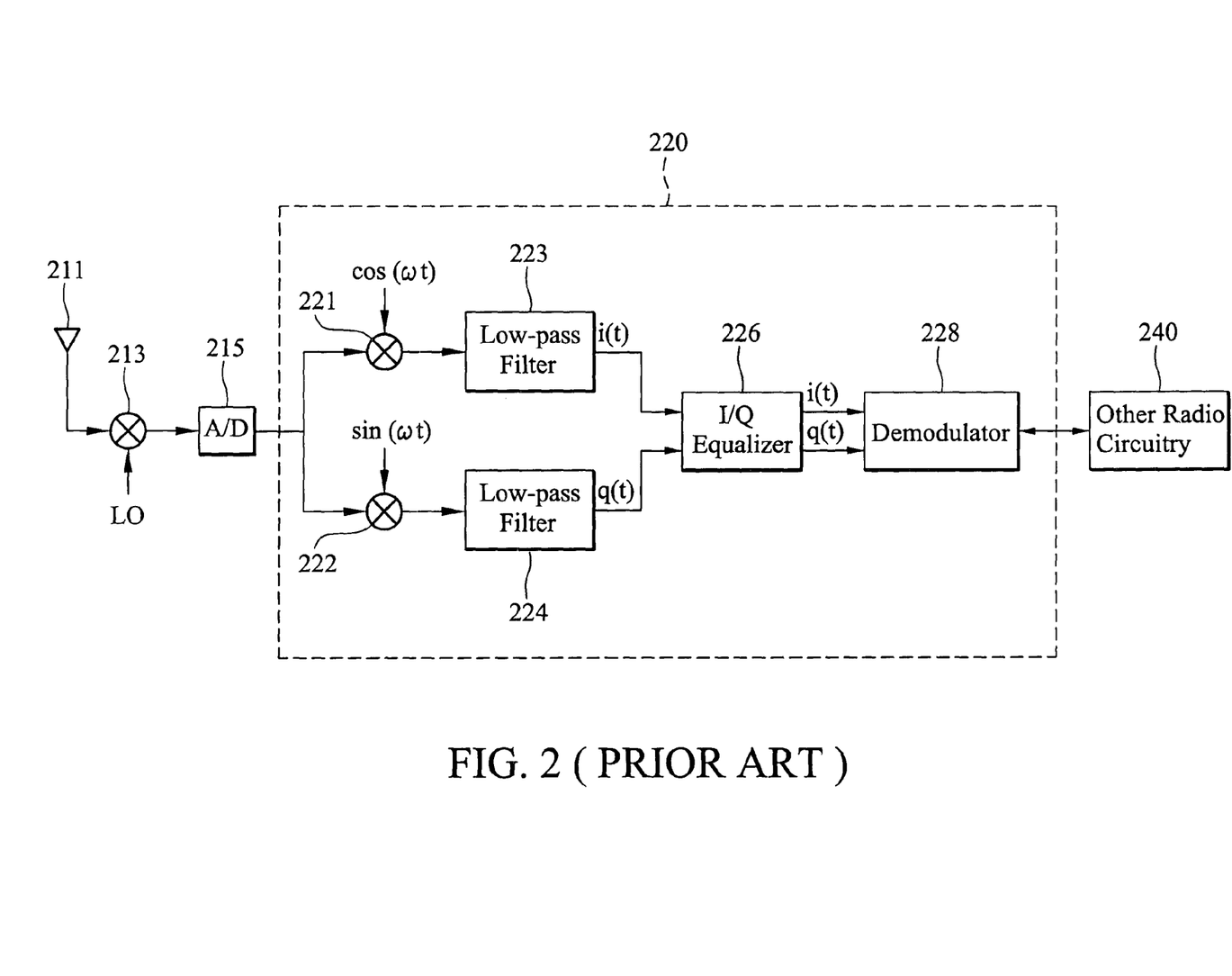
FIG. 2 shows an apparatus for correcting phase and gain imbalance between in-phase and quadrature components of a received signal based on a determination of peak amplitudes disclosed in U.S. Pat. No. 5,949,821.

U.S. Pat. No. 5,949,821 discloses an apparatus for correcting phase and gain imbalance between in-phase and quadrature components of a received signal based on a determination of peak amplitudes. As shown in FIG. 2, it includes an equalizer 226 for correcting imbalance between in-phase and quadrature components of a received signal. The equalizer 226 determines peak amplitude for the in-phase and quadrature components, and the phase imbalance between both components. At least one of the in-phase and quadrature components is adjusted based on a function of the phase imbalance, and of the ratio of peak amplitudes of the in-phase and quadrature components.

Although there are already many kinds of compensation circuits and methods, it is still a goal of research to propose newer and better solutions to the I/Q mismatch problems in a receiver.

SUMMARY OF THE INVENTION

The object of the present invention is to provide a new method and apparatus for I/Q mismatch calibration of a receiver.

To achieve the above-mentioned object, the present invention provides a method for I/Q mismatch calibration of a receiver having an I/Q correction module with correction parameters $A_p$ and $B_p$, comprising the steps of generating a test signal containing a single tone waveform with frequency of a carrier frequency $f_c$ Hz plus a predetermined frequency $f_T$ Hz, applying I/Q demodulation to reduce the central frequency of the test signal by $f_c$ Hz and outputting a demodulated signal, converting the demodulated signal to a digital signal, obtaining measures $U_1$ and $U_2$ of the digital signal where $U_1$ and $U_2$ are values indicative of the frequency response of the digital signal at frequency $+f_T$ Hz and $-f_T$ Hz, respectively, and calculating the set of the correction parameters $A_p$ and $B_p$ for the I/Q correction module based on the measures $U_1$ and $U_2$.

In addition, the present invention provides an apparatus for I/Q mismatch calibration of a receiver having an I/Q correction module with correction parameters $A_p$ and $B_p$. A signal generator generates a test signal containing a single tone waveform with frequency of a carrier frequency $f_c$ Hz plus a predetermined frequency $f_T$ Hz. A demodulator applies I/Q demodulation to reduce the central frequency of the test signal by $f_c$ Hz and outputs a demodulated signal. An A/D converter converts the demodulated signal to a digital signal. A dual-tone correlator obtains measures $U_1$ and $U_2$ of the digital signal where $U_1$ and $U_2$ are values indicative of the frequency response of the demodulated signal at frequency $+f_T$ Hz and $-f_T$ Hz, respectively. A processor obtains the set of the correction parameters $A_p$ and $B_p$ according to the measures $U_1$ and $U_2$.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

The mathematical theories of the invention will be described in the following.

The equivalent baseband signals for the I and Q channels before the I/Q demodulation are represented as $x_I(t)$ and $x_Q(t)$ respectively. Ideally, the signal before the I/Q demodulation can be expressed as $$r(t) = x_I(t) \cdot \cos(2\pi f_c t) - x_Q(t) \cdot \sin(2\pi f_c t) \quad (7)$$
$$= \text{Re}\{x(t) \cdot e^{j2\pi f_c t}\}$$

where $x(t)=x_I(t)+jx_Q(t)$ and $f_c$ denotes the carrier frequency. Assuming that an amplitude mismatch a and a phase mismatch θ results from the I/Q demodulation, the baseband signals $y_I(t)$ and $y_Q(t)$ for the I and Q channels after the I/Q demodulation are, without loss of generality, given by the equations:

$$y_I(t)=x_I(t)\cdot(1+\alpha)\cdot\cos(\theta/2)+x_Q(t)\cdot(1+\alpha)\cdot\sin(\theta/2) \quad (8)$$

$$y_Q(t)=x_I(t)\cdot(1-\alpha)\cdot\sin(\theta/2)+x_Q(t)\cdot(1-\alpha)\cdot\cos(\theta/2)$$

The combined baseband signal y(t) after the I/Q demodulation can be expressed as $y_I(t)+jy_Q(t)$. Thus, from the equation (8), the following equation can be derived:

$$y(t)=A \cdot x(t)+B \cdot x^*(t) \quad (9)$$

where A and B are complex numbers with $$A = \frac{1}{2}\{(1+\alpha)e^{j\theta/2} + (1-\alpha)e^{-j\theta/2}\} \quad (10)$$

$$B = \frac{1}{2}\{(1+\alpha)e^{j\theta/2} - (1-\alpha)e^{-j\theta/2}\}$$

For receiver I/Q mismatch compensation, we may compensate the signal after the A/D conversion. Two A/D convertors are needed. The first A/D convertor is used for converting the I channel signal $y_I(t)$ to a I channel digital signal $Y_I[n]$, while the second A/D convertor is used for converting the Q channel signal $y_Q(t)$ to a Q channel digital signal $y_Q[n]$. Let $y[n]=y_I[n]+jy_Q[n]$ denote the sampled signal of y(t) and $w[n]=D(y[n])$ be the compensated output. The compensation equation may be $$w[n]=A_p y[n]+B_p y^*[n] \quad (11)$$

Ideally, after the compensation, $w[n]=C \cdot x[n]$ where C is a constant. By substituting $y[n]=A \cdot x[n]+B \cdot x^*[n]$ into the equation (11), we derive:

$$w[n]=(A_p \cdot A+B_p \cdot B^*) \cdot x[n]+(A_p \cdot B+B_p \cdot A^*) \cdot x^*[n] \quad (12)$$

Accordingly, the equation $w[n]=C \cdot x[n]$ is satisfied only if $$\begin{cases} A_p \cdot B + B_p \cdot A^* = 0 \\ A_p \cdot A + B_p \cdot B^* = C \end{cases} \quad (13)$$

Therefore, the goal of the calibration method in the invention is the identification of the coefficients $A_p$ and $B_p$ which satisfy equation (13).

The I/Q mismatch should be measured over the pass band frequency range (e.g., over 0 to 8 MHz for the case of 802.11 g). We consider the estimation of the gain mismatch over a specific frequency of $f_T$ Hz, i.e., 2.5 MHz, for the 802.11a OFDM system. Note that, in general, $f_T$ could be a positive or negative real number. Let $f_c$ be the carrier frequency. A single-tone test signal is generated at frequency $f_c+f_T$.

Figure 3:
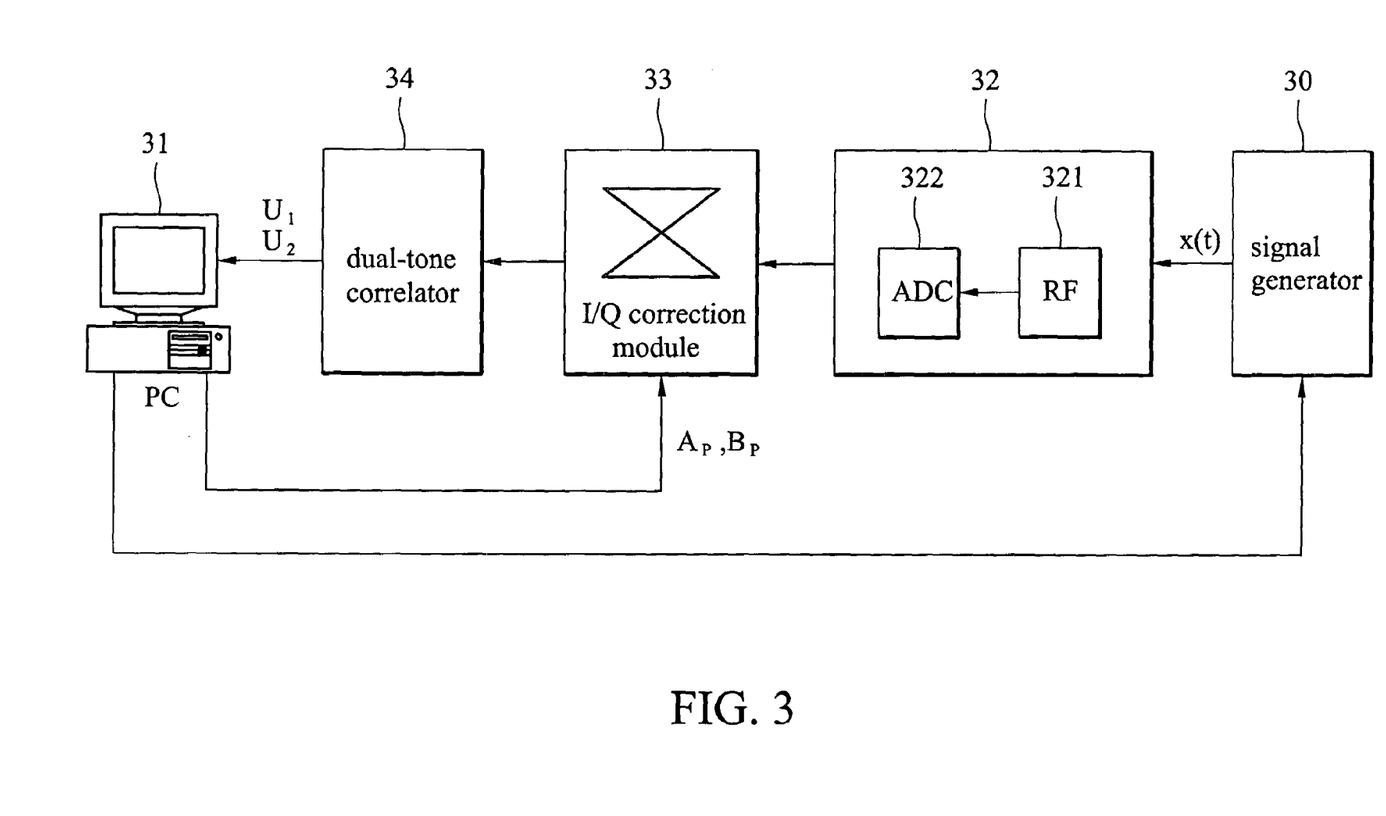
FIG. 3 shows a setup of RX I/Q channel mismatch calibration for 802.11g of a receiver according to the embodiment of the present invention.

FIG. 3 shows a setup of RX I/Q channel mismatch calibration for 802.11g of a receiver according to the embodiment of the present invention. A signal generator 30 generates a test signal x(t) which contains a single-tone waveform which can be expressed as $\cos(2\pi(f_c+f_T)t)$. The frequency and the power of the single-tone waveform are under the control of a personal computer 31. This waveform is fed into the DUT (device under test) 32. The RF section 321 of the DUT 32 down-converts the test signal x(t) to a baseband signal $x_{dem}(t)$. To speak more specifically, the RF section 321 of the DUT 32 demodulates the test signal x(t) by reducing the central frequency of the test siganl x(t) by $f_c$ Hz and outputting a demodulated signal $x_{dem}(t)$. This baseband signal $x_{dem}(t)$ is sampled by the analog-to-digital converters (ADC) 322 with a sampling rate of, for example, 40 MHz and is converted to a digital signal $x_{dem}[n]$. Note that two ADCs are needed. The first ADC is used for converting the real part of $x_{dem}(t)$ to a real part of digital signal $x_{dem}[n]$, while the second ADC is used for converting the imaginary part of signal $x_{dem}(t)$ to the imaginary part of digital signal $x_{dem}[n]$. The I/Q correction module 33 corrects the I/Q mismatch in the signal outputted from the ADC 322 by a function $w[n]=A_p \cdot x_{dem}[n]+B_p \cdot x^*_{dem}[n]$, where w[n] is the corrected signal, $x_{dem}[n]$ is the signal from the ADC 322, and $A_p$ and $B_p$ are correction coefficients. In the purposed I/Q calibration stage, the correcting coefficients $A_p$ and $B_p$ are initially set to $A_p=1$ and $B_p=0$. In other words, the I/Q correction module is transparent in the I/Q calibration stage such that $w[n]=x_{dem}[n]$. The dual-tone correlator 34 correlates the digital signal $x_{dem}[n]$ and outputs two measures $U_1$ and $U_2$, where the measure $U_1$ represents a desired component which is a value indicative of the frequency response of $x_{dem}(t)$ at frequency $+f_T$ Hz and the measure $U_2$ represents an image component which is a value indicative of the frequency response of $x_{dem}(t)$ at frequency $-f_T$ Hz. For the case that $x(t)=\cos(2\pi(f_c+f_T)t)$, $$x_{dem}(t) = \left(\cos\frac{\theta}{2} - j\alpha\sin\frac{\theta}{2}\right)e^{j2\pi f_T t} + \left(\alpha\cos\frac{\theta}{2} + j\sin\frac{\theta}{2}\right)e^{-j2\pi f_T t}$$

and $$U_1 = \lambda\left(\cos\frac{\theta}{2} - j\alpha\sin\frac{\theta}{2}\right)$$

$$U_2 = \lambda\left(\alpha\cos\frac{\theta}{2} + j\sin\frac{\theta}{2}\right)$$

where λ is a constant related to the dual-tone correlator 34.

Next, the two measures $U_1$ and $U_2$ are read by the personal computer 31, and the software stored in a personal computer 31 computes the parameters $A_p$ and $B_p$ required by the I/Q correction module 33 according to the measures $U_1$ and $U_2$ to minimize the impacts due to the I/Q channel mismatch. In this case, we have $$X = U_1 \cdot U_2 = \kappa\alpha + j\frac{\kappa(1-\alpha^2)}{2}\sin\theta = H + jI \quad (14)$$

$$G = |U_1|^2 + |U_2|^2 = \kappa(1+\alpha^2) \quad (15)$$

where $\kappa = \lambda^2$, $H = \text{real}(X)$ is the real part of X and $I = \text{imag}(X)$ is the imaginary part of X. Since $$\kappa = \frac{G}{(1+\alpha^2)} > \frac{G}{2},$$

from equation (14) and (15), it can be found that $$\kappa = \frac{G + \sqrt{G^2 - 4H^2}}{2}. \quad (16)$$

Consequently, the gain mismatch term is evaluated by $$\alpha = \frac{H}{\kappa} \quad (17)$$

and we can further have $$Q = \sin\theta = \frac{2 \cdot I}{\kappa \cdot (1-\alpha^2)} \quad (18)$$

$$P = \cos\theta = \sqrt{1-Q^2} \quad (19)$$

$$R = \cos\frac{\theta}{2} = \sqrt{\frac{1+P}{2}} \quad (20)$$

$$S = \sin\frac{\theta}{2} = \frac{Q}{2 \cdot R} \quad (21)$$

The software stored in the personal computer 31 according to the embodiment of the present invention performs a different process from the prior art. Thus, the personal computer 31 implements the following functions to update the coefficients $A_p$ and $B_p$ according to the equations (17)~(21)

$$\begin{cases} A_p = R + j\alpha S \\ B_p = -\alpha R - jS \end{cases} \quad (22)$$

Next, the updated coefficients are fed back to the I/Q correction module 33.

Additionally, the updated coefficients $A_p$ and $B_p$ may be normalized so that the power of the corrected signal w[n] is the same as that of the digital signal $x_{dem}[n]$.

Figure 4:
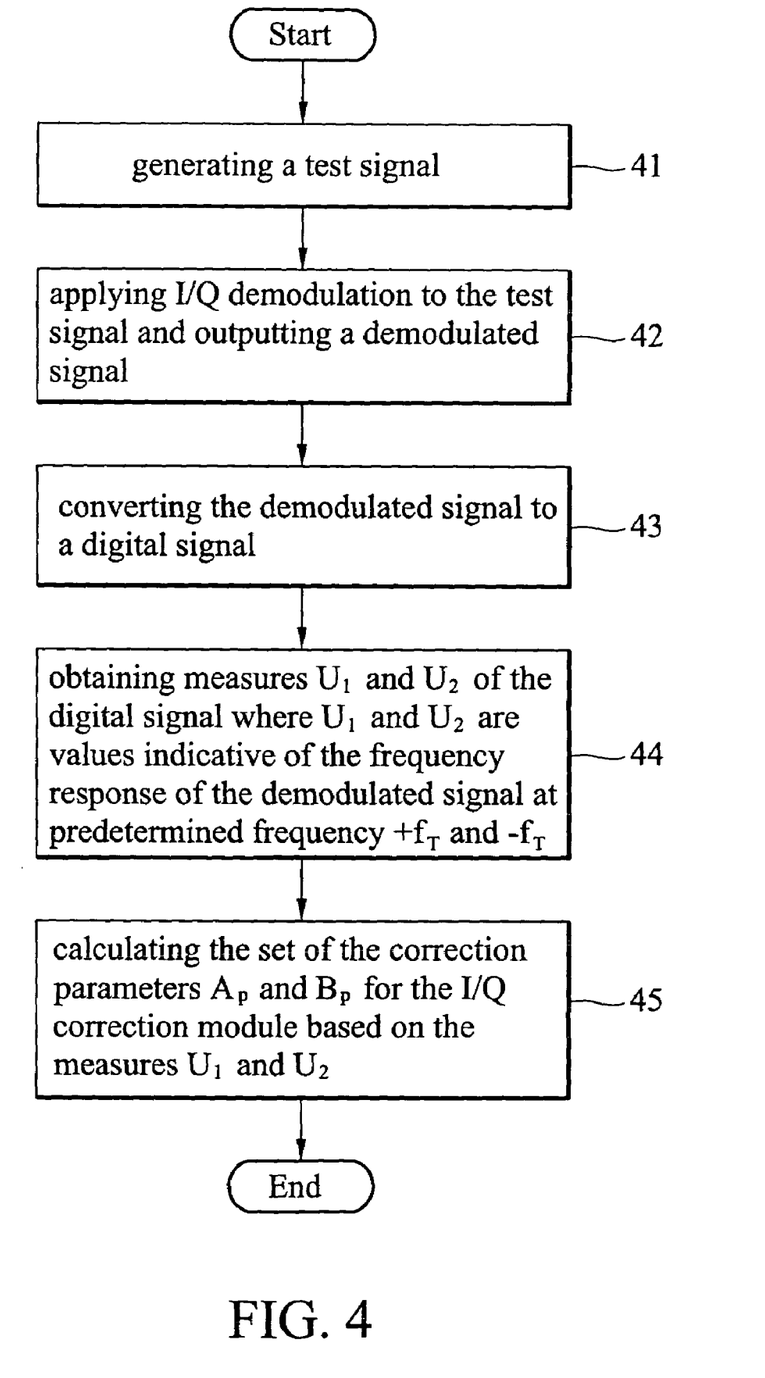
FIG. 4 is a flowchart of a method for I/Q mismatch calibration of a receiver according to the embodiment of the present invention.

FIG. 4 is a flowchart of a method for I/Q mismatch calibration of a receiver according to the embodiment of the present invention. The method is applied to a receiver having an I/Q correction module using parameters $A_p$ and $B_p$. The calibration procedure of the invention will be specifically described in the following.

In step 41, an analog test signal x(t) is generated. The signal x(t) contains a single-tone waveform with a frequency of ($f_c + f_T$), where $f_c$ is the carrier frequency and $f_T$ is a predetermined real number In step 42, I/Q demodulation is applied to reduce the central frequency of the signal x(t) by $f_c$ Hz and output a demodulated signal $x_{dem}(t)$.

In step 43, the analog signal $x_{dem}(t)$ is converted to a digital signal $x_{dem}[n]$ with sampling rate $f_s$.

In step 44, the measures $U_1$ and $U_2$ of the digital signal $x_{dem}[n]$ are obtained where $U_1$ and $U_2$ are values indicative of the frequency response of $x_{dem}(t)$ at frequency $+f_T$ Hz and $-f_T$ Hz, respectively. The measures $U_1$ and $U_2$ of $x_{dem}(t)$ are obtained from the coefficients of the Fourier transformation of the $x_{dem}[n]$ corresponding to the frequency $+f_T$ Hz and $-f_T$ Hz. The measures $U_1$ and $U_2$ are obtained by the dual-tone correlator 34 as shown in FIG. 3.

In step 45, the correction parameters $A_p$ and $B_p$ is calculated by the personal computer for the I/Q correction module based on the measures $U_1$ and $U_2$. The set of correction parameters ($A_p$, $B_p$) is obtained by the equation (22) according to the equations (17)~(21).

$$\begin{cases} A_p = R + j\alpha S \\ B_p = -\alpha R - jS \end{cases}$$

In addition, the set of correction parameters ($A_p$, $B_p$) is further normalized by $$\begin{cases} A_p = \chi(R + j\alpha S) \\ B_p = \chi(-\alpha R - jS) \end{cases} \text{where} \quad (23)$$

$$\chi = \frac{1}{(1-\alpha^2) \cdot P} \quad (24)$$

such that the power of the output signal of the I/Q correction module equals that of the input signal of the I/Q correction module.

The previously described method can be applied to a transceiver module, e.g., an IEEE 802.11 compliant wireless LAN transceiver module, involving I/Q demodulation. Wireless LANs based on the IEEE 802.11 standard have achieved wide customer acceptance in the enterprise environment. They are expected to continue to expand in popularity and become ubiquitous communication systems even in private and public places. Prior to the circuit for I/Q mismatch calibration in the present invention, the basics of the IEEE 802.11 wireless LAN physical layer will be described in the following.

Originally, the 802.11 standard was written for 1 Mb/s and 2 Mb/s data rates in the 2.4 GHz–2.5 GHz ISM band, possibly using direct sequence code division multiplexing in combination with DBPSK and DQPSK modulation, respectively. An eleven-chip long Barker sequence provides processing gain, which relaxes the SNR to below 0 dB. The channel bandwidth of 14 MHz placed anywhere in the band on a 5 MHz grid allows network configurations with 3–4 access points in close physical proximity. The maximum RF transmitting power is 30 dBm.

The 802.11b standard option enhances the wireless LAN data rate to a maximum of 11 Mb/s by Complementary Code Keying (CCK) modulation. While still using the same chip rate in order not to change the RF signal bandwidth, a much-reduced processing gain accommodates the higher data rate at the expense of approximately 10 dB higher SNR requirements. Practically, at 11 Mb/s CCK is equivalent in almost all respects to regular DQPSK.

The recent advances in RFIC and radio system technologies have provided ample opportunities for the realization of miniaturized and economically viable wireless LAN transceivers. Typically, these blocks are implemented using a few ICs and several hundred passives (mostly by-pass capacitors), packaged tightly into small modules such as PCMCIA cards. Usually the cost of such modules is well within the consumer electronics market demands.

Focusing on the physical layer, notice that a radio chip and a base-band chip are typically used with analog I/Q transmit and receive interfaces. The base-band chip is mostly a digital circuit, containing only data converters. This system partitioning minimizes the digital switching noise coupling into the radio sections and provides low power chip-to-chip analog interfaces. The radio chip may be designed by different technologies such as Si bipolar, SiGe BiCMOS, or recently, even in straight CMOS. Typically, a −75 dBm sensitivity is accomplished for about 200 mW receiver power dissipation. The radio architecture has evolved from a conservative super-heterodyne approach to less expensive direct down/up conversion. The efficiency of the linear power amplifier is limited by the signal peak-to-average ratio, which is moderate, allowing reasonable transmitter power dissipation, typically 500 mW.

Using the standard, one can derive the basic transceiver specifications. The following approximate calculations are not intended to give precise design values but rather to indicate the rough figures for 802.11a radio systems.

The signal to noise-plus-distortion ratio (SNR) at the receiver A/D output is the primary overall design requirement. Starting with the −174 dBm/Hz background thermal noise and adding 73 dB corresponding to the 20 MHz channel bandwidth we obtain −101 dBm for the antenna noise. Subtracting this number from the required −65 dBm receiver sensitivity (minimum antenna signal), we calculate an input SNR of 36 dB. Since the standard assumes a 15 dB noise figure (NF) receiver, everything else being ideal, 21 dB SNR results at the output of the receiver A/D converter. This is a static channel calculation, assuming no fading and not taking into account the SNR loss in the base-band processing due to many error sources.

If fading is present, the previous calculation is amended by about a 5 dB "channel correction factor", as it can be simulated for a 54 Mb/s with 50 ns RMS delay spread. The required SNR at the output of the A/D converter jumps to approximately 26 dB. Furthermore, transmitter and receiver practical errors are usually responsible for at least 3–4 dB performance deterioration so a final 30 dB SNR is estimated. Referring this number back to the original SNR calculation and assuming the same −65 dBm sensitivity, we see that a practical receiver will have a NF less than 7 dB. Notice that the only ways the design methodology can make a difference in the transceiver performance are by minimizing the receiver NF and the various practical errors mentioned previously. For this reason it is instructive to identify these errors and the circuit blocks where they are produced.

The "receiver thermal noise" is independent of the signal and is given by the NF. The "receiver implementation noise" is signal dependent and is produced by many non-idealities such as local oscillator noise, non-linearity in receiver chain, I/Q imbalances (mismatch), DC offsets, A/D converter quantization noise, residual adjacent channels or blockers due to insufficient filtering, etc. We see that a large number of negative factors produce errors, which can easily add up to many SNR dB losses.

In conclusion, the present invention provides a new method and apparatus for receiver I/Q mismatch calibration, especially suitable for an IEEE 802.11 compliant WLAN transceiver module. The compensation of the I/Q mismatch is achieved by an I/Q correction module posterior to the I/Q demodulator.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for I/Q mismatch calibration of a receiver having an I/Q correction module which performs $x_o[n] = A_p \cdot x_i[n] + B_p \cdot x_i^*[n]$ where $x_i[n]$ and $x_o[n]$ respectively represent the input and output signal of the I/Q correction module, the superscript * refers to a complex conjugate, and $A_p$ and $B_p$ are correction parameters, comprising the following steps:

generating a test signal x(t) containing a single tone waveform with frequency of $(f_c+f_T)$ Hz, where $f_c$ and $f_T$ are real numbers;

applying I/Q demodulation to reduce the central frequency of the test signal x(t) by $f_c$ Hz and output a demodulated signal $x_{dem}(t)$;

converting the demodulated signal $x_{dem}(t)$ to a digital signal $x_{dem}[n]$;

obtaining measures $U_1$ and $U_2$ of the digital signal $x_{dem}[b]$ where $U_1$ and $U_2$ are values indicative of the frequency response of $x_{dem}(t)$ at frequency $+f_T$ Hz and $-f_T$ Hz, respectively; and calculating the set of the correction parameters $A_p$ and $B_p$ for the I/Q correction module based on the measures $U_1$ and $U_2$.

2. The method for I/Q mismatch calibration of a receiver as claimed in claim 1, the measure $U_1$ and $U_2$ are obtained from the coefficients of the Fourier transformation of the $x_{dem}[n]$ corresponding to the frequency $+f_T$ Hz and $-f_T$ Hz.

3. The method for I/Q mismatch calibration of a receiver as claimed in claim 1, wherein the test signal $x(t)=\cos(2\pi(f_c+f_T))$.

4. The method for I/Q mismatch calibration of a receiver as claimed in claim 1, wherein the set of correction parameters $(A_p, B_p)$ are obtained by $$\begin{cases} A_p = R + j\alpha S \\ B_p = -\alpha R - jS \end{cases}$$

where $\alpha$, R, and S are obtained based on $U_1$ and $U_2$.

5. The method for I/Q mismatch calibration of a receiver as claimed in claim 4, wherein $\alpha$, R, and S are obtained based on $H = \text{real}(U_1 \cdot U_2)$, $I = \text{imag}(U_1 \cdot U_2)$, and $G = |U_1|^2 + |U_2|^2$.

6. The method for I/Q mismatch calibration of a receiver as claimed in claim 4.1, wherein α, R, and S are obtained by $$\alpha = \frac{H}{\kappa}, \quad \text{where } \kappa = \frac{G + \sqrt{G^2 - 4H^2}}{2}, \quad \text{and } R = \sqrt{\frac{1+P}{2}},$$

$$S = \sqrt{\frac{Q}{2 \cdot \sqrt{\frac{1+P}{2}}}}, \quad \text{where } Q = \frac{2 \cdot I}{\kappa \cdot (1-\alpha^2)}, \quad P = \sqrt{1 - \left(\frac{2 \cdot I}{\kappa \cdot (1-\alpha^2)}\right)^2}.$$

7. The method for I/Q mismatch calibration of a receiver as claimed in claim 4, wherein the set of correction parameters ($A_p$, $B_p$) is further normalized such that the power of the output signal of the I/Q correction module equals to that of the input signal of the I/Q correction module.

8. An apparatus for I/Q mismatch calibration of a receiver having an I/Q correction module which performs $x_o[n] = A_p \cdot x_i[n] + B_p \cdot x^*_i[n]$ where $x_i[n]$ and $x_o[n]$ respectively represent the input and output signal of the I/Q correction module, the superscript * refers to a complex conjugate, and $A_p$ and $B_p$ are correction parameters, comprising:

- a signal generator for generating a test signal x(t) which contains a single tone waveform with frequency of ($f_c + f_T$) Hz, where $f_c$ and $f_T$ are real numbers;
- a demodulator for applying I/Q demodulation to reduce the central frequency of the test signal x(t) by $f_c$ Hz and outputting a demodulated signal $x_{dem}(t)$;
- A/D converters for converting the demodulated signal $x_{dem}(t)$ to a digital signal $x_{dem}[n]$;
- a dual-tone correlator for obtaining measures $U_1$ and $U_2$ of the digital signal $x_{dem}[n]$ output from the I/Q correction module where $U_1$ and $U_2$ are values indicative of the frequency response of $x_{dem}(t)$ at frequency $+f_T$ Hz and $-f_T$ Hz, respectively; and
- a processor for obtaining the set of the correction parameters $A_p$ and $B_p$ according to the measures $U_1$ and $U_2$.

9. The apparatus for I/Q mismatch calibration of a receiver as claimed in claim 8, the measure $U_1$ and $U_2$ are obtained from the coefficients of the Fourier transformation of the $x_{dem}[n]$ corresponding to the frequency $+f_T$ Hz and $-f_T$ Hz.

10. The apparatus for I/Q mismatch calibration of a receiver as claimed in claim 8, wherein the test signal $x(t) = \cos(2\pi(f_c + f_T))$.

11. The apparatus for I/Q mismatch calibration of a receiver as claimed in claim 8, wherein the set of correction parameters ($A_p$, $B_p$) are obtained by $$\begin{cases} A_p = R + j\alpha S \\ B_p = -\alpha R - jS \end{cases}$$

where α, R, and S are obtained based on $U_1$ and $U_2$.

12. The apparatus for I/Q mismatch calibration of a receiver as claimed in claim 11, wherein α, R, and S are obtained based on $H = \text{real}(U_1 \cdot U_2)$, $I = \text{imag}(U_1 \cdot U_2)$, and $G = |U_1|^2 + |U_2|^2$.

13. The apparatus for I/Q mismatch calibration of a receiver as claimed in claim 12, wherein α, R, and S are obtained by $$\alpha = \frac{H}{\kappa}, \quad \text{where } \kappa = \frac{G + \sqrt{G^2 - 4H^2}}{2}, \quad \text{and } R = \sqrt{\frac{1+P}{2}},$$

$$S = \sqrt{\frac{Q}{2 \cdot \sqrt{\frac{1+P}{2}}}}, \quad \text{where } Q = \frac{2 \cdot I}{\kappa \cdot (1-\alpha^2)}, \quad P = \sqrt{1 - \left(\frac{2 \cdot I}{\kappa \cdot (1-\alpha^2)}\right)^2}.$$

14. The apparatus for I/Q mismatch calibration of a receiver as claimed in claim 11, wherein the set of correction parameters ($A_p$, $B_p$) is further normalized such that the power of the output signal of the I/Q correction module equals to that of the input signal of the I/Q correction module.

* * * * *